(12) United States Patent
Zuckerberg et al.

(10) Patent No.: US 8,312,140 B2
(45) Date of Patent: **\*Nov. 13, 2012**

(54) DYNAMICALLY UPDATING MEDIA CONTENT FOR DISPLAY TO A USER OF A SOCIAL NETWORK ENVIRONMENT BASED ON USER INTERACTIONS

(75) Inventors: Mark Zuckerberg, Palo Alto, CA (US); Andrew Bosworth, Palo Alto, CA (US); Chris Cox, Palo Alto, CA (US); Ruchi Sanghvi, Palo Alto, CA (US); Matt Cahill, Sunnyvale, CA (US)

(73) Assignee: Facebook, Inc., Menlo Park, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/448,157

(22) Filed: Apr. 16, 2012

(65) Prior Publication Data
US 2012/0203838 A1    Aug. 9, 2012

Related U.S. Application Data

(63) Continuation of application No. 11/503,037, filed on Aug. 11, 2006, now Pat. No. 8,171,128.

(51) Int. Cl.
*G06F 15/173* (2006.01)
(52) U.S. Cl. .................. 709/224; 707/702; 709/204
(58) Field of Classification Search .................. 709/224, 709/204
See application file for complete search history.

(56) References Cited

U.S. PATENT DOCUMENTS

| | | | |
|---|---|---|---|
| 6,029,195 A | 2/2000 | Herz | |
| 7,792,815 B2 \* | 9/2010 | Aravamudan et al. | 707/708 |
| 7,809,709 B1 \* | 10/2010 | Harrison, Jr. | 707/707 |
| 2004/0148275 A1 | 7/2004 | Achlioptas | |
| 2006/0042483 A1 | 3/2006 | Work et al. | |
| 2006/0048059 A1 | 3/2006 | Etkin | |

(Continued)

FOREIGN PATENT DOCUMENTS

| | | |
|---|---|---|
| JP | 2002-245212 A | 8/2002 |
| WO | WO 2005/089291 A2 | 9/2005 |
| WO | WO 2006/019752 A1 | 2/2006 |
| WO | WO 2006/044939 A2 | 4/2006 |

OTHER PUBLICATIONS

Canadian Intellectual Property Office, Requisition by the Examiner, Canadian Patent Applciation No. 2,660,459, Jul. 27, 2012, 6 pages.

(Continued)

*Primary Examiner* — Patrice Winder
*Assistant Examiner* — Tauqir Hussain
(74) *Attorney, Agent, or Firm* — Fenwick & West LLP

(57) ABSTRACT

A system and method provides dynamically selected media content to someone using an electronic device in a social network environment. Items of media content are selected for the user based on his or her relationships with one or more other users. The user's relationships with other users are reflected in the selected media content and its format. An order is assigned to the items of media content, for example, based on their anticipated importance to the user, and the items of media content are displayed to the user in the assigned order. The user may change the order of the items of media content. The user's interactions with media content available in the social network environment are monitored, and those interactions are used to select additional items of media content for the user.

26 Claims, 5 Drawing Sheets

U.S. PATENT DOCUMENTS

| | | | |
|---|---|---|---|
| 2006/0143067 A1 | 6/2006 | Calabria | |
| 2006/0242139 A1* | 10/2006 | Butterfield et al. | 707/5 |
| 2006/0242178 A1* | 10/2006 | Butterfield et al. | 707/100 |
| 2007/0226314 A1* | 9/2007 | Eick et al. | 709/217 |
| 2007/0261071 A1* | 11/2007 | Lunt et al. | 725/13 |
| 2007/0266097 A1* | 11/2007 | Harik et al. | 709/204 |
| 2009/0171950 A1* | 7/2009 | Lunenfeld | 707/5 |
| 2010/0057555 A1* | 3/2010 | Butterfield et al. | 705/14.41 |

OTHER PUBLICATIONS

China State Intellectual Property Office, Decision of Rejection, Chinese Application No. 2007-80034021.3, Mar. 29, 2012, 9 pages.

Japanese Patent Office, Notice of Grounds for Rejection, Japanese Patent Application No. P2009-523824, Apr. 24, 2012, 6 pages.

Japanese Patent Office, Notice of Grounds for Rejection, Japanese Patent Application No. P2009-523825, May 22, 2012, 5 pages.

Takai, K., et al., "ACS: A Social Networking System for Various Human Relations," *Proceedings of the Annual Conference on JSAI (CD ROM)*, vol. 20, Jul. 2006, pp. 577-580 (with English abstract).

Tsuruoka, N., "Web 2.0 Practice Technique: Google, Yahoo!, Rest," WEB +DB Press, Japan, issued by Kabushikikaisha Gijutsuhyouronsha, vol. 32, First Edition, May 25, 2006, pp. 84-90.

* cited by examiner

FIG. 4

DYNAMICALLY UPDATING MEDIA CONTENT FOR DISPLAY TO A USER OF A SOCIAL NETWORK ENVIRONMENT BASED ON USER INTERACTIONS

CROSS-REFERENCE TO RELATED APPLICATIONS

The present application is a continuation of U.S. application Ser. No. 11/503,037, filed on Aug. 11, 2006, and entitled "Communicating a Newsfeed of Media Content Based on a Member's Interactions in a Social Network Environment," which is hereby incorporated by reference in its entirety. The present application also incorporates by reference the following applications in their entirety: U.S. Application No. 60/750,844, filed on Dec. 14, 2005, for "Systems and Methods for Social Mapping," U.S. Application No. 60/753,810, filed on Dec. 23, 2005, for "Systems and Methods for Social Timeline," U.S. application Ser. No. 11/493,291, filed on Jul. 25, 2006, for "Systems and Methods for Dynamically Generating a Privacy Summary," U.S. patent application Ser. No. 11/502,757 filed on Aug. 11, 2006, for "Systems and Methods for Generating Dynamic Relationship-Based Content Personalized for Members of a Web-Based Social Network," U.S. patent application Ser. No. 11/503,093, filed on Aug. 11, 2006, for "Systems and Methods for Measuring User Affinity in a Social Network Environment," and U.S. patent application Ser. No. 11/503,242, filed on Aug. 11, 2006, for "System and Method for Dynamically Providing a News Feed About a User of a Social Network."

BACKGROUND OF THE INVENTION

1. Field of the Invention

The present invention relates generally to media presentation, and more particularly to systems and methods for presenting dynamically selected media content to a user of an electronic device in a social network environment.

2. Description of Related Art

Conventionally, users of networking websites connect with other users and provide information about themselves. For example, a user may post contact information, background information, current job position, hobbies, and so forth. Other users may contact the posting user based on common interests, or for any other reason.

Recently, social networking websites have developed systems for tailoring connections between various users. For example, users may be grouped based on geographical location, job type, and so forth. Social networking offers users the opportunity for frequent, automatic notification of changes in the information posted by other users.

There are existing mechanisms that allow a user to display information about other users. Some mechanisms may allow the user to select particular items of media content for immediate viewing. Typically, however, these items of media content are disparate and disorganized. In other words, the user must spend time researching a topic by searching for, identifying, and reading individual items of media content that are not presented in a coherent, consolidated manner. Further, often the user remains unaware of the existence of some items of media content that were not captured in the user's research. For example, in a typical social networking environment, one would have to look up another user and click on various links to find information about the other user.

In addition, there are news feeds to which one can subscribe that can provide information on a particular topic via automatic download to an electronic device associated with a user. However, the downloaded information is not selected and presented based on the user's relationships with other users, and does not occur within the context of a social network. What is desired is a way for a user of a social network automatically to receive items of media content that are dynamically selected and presented to the user based on his relationships with other users.

SUMMARY OF THE INVENTION

The present invention provides a system and method for providing dynamically selected media content to a user of an electronic device in a social network environment. Items of media content are selected for the user based on his or her relationships with one or more other users. The user's relationships with other users are reflected in the selected media content and its format. An order may be assigned to the selected items of media content, for example, based on their importance to the user, and the items of media content displayed to the user in that order. The user may change the order of the items of media content. The user's interactions with the items of media content and other items provided by the social network provider are monitored, and those interactions are used to select additional items of media content for the user. In a method according to one embodiment of the invention, the frequency of user interaction with other users and objects on the network is analyzed to identify events, relationships, news items and other objects of interest to the user, and to rank them in importance to the user. The results of this analysis are used to select, consolidate and tailor content for news stories to be presented to the user in a personalized, dynamic news feed that may be more interesting or desirable to the user because of its selection based upon the user's personal relationships.

BRIEF DESCRIPTION OF THE DRAWINGS

FIG. 4 is an exemplary media display screen, such as might be displayed to a user in a social network environment.

DETAILED DESCRIPTION OF THE INVENTION

A system and method is provided for presenting dynamically selected media content to a user of an electronic device in a social network environment. Items of media content are selected for the user based on his or her relationships with one or more other users, with whom the user is associated through a social network provider. The user's relationships with other users are reflected in the selected media content and its format. For example, media content concerning the user's brother, wife, or best friend from college may be presented to the user as being about "your brother," "your wife" and "your best friend from college," respectively. Accordingly, the media content dynamically selected for and presented to the user is personalized in a way that would be less meaningful or interesting if viewed by someone other than the user.

An order is assigned to the selected media content, for example, based on its importance to the user, and the media content is displayed to the user in the assigned order. The user may change the order of the items of media content, for example, via a separate settings display that allows the user to prioritize and/or filter certain items of media content, and/or also by using a "drag-and-drop" function to organize stories dynamically on the media content display. The user's interactions with the media content and other items provided by the social network provider are monitored, and those interactions are used to select additional items of media content for the user. In a method according to one embodiment of the invention, the frequency of user interaction with other users and objects on the network is analyzed to identify events, relationships, news items and other objects of interest to the user, and to rank them in importance to the user as reflected in the descending order of the frequency of the user's interaction with other users. In a display according to such an embodiment, the results of this analysis are used to select, consolidate and tailor content for news stories to be presented to the user in a personalized, dynamic news feed that is more meaningful to the user because of its basis in the user's personal relationships.

Figure 1:
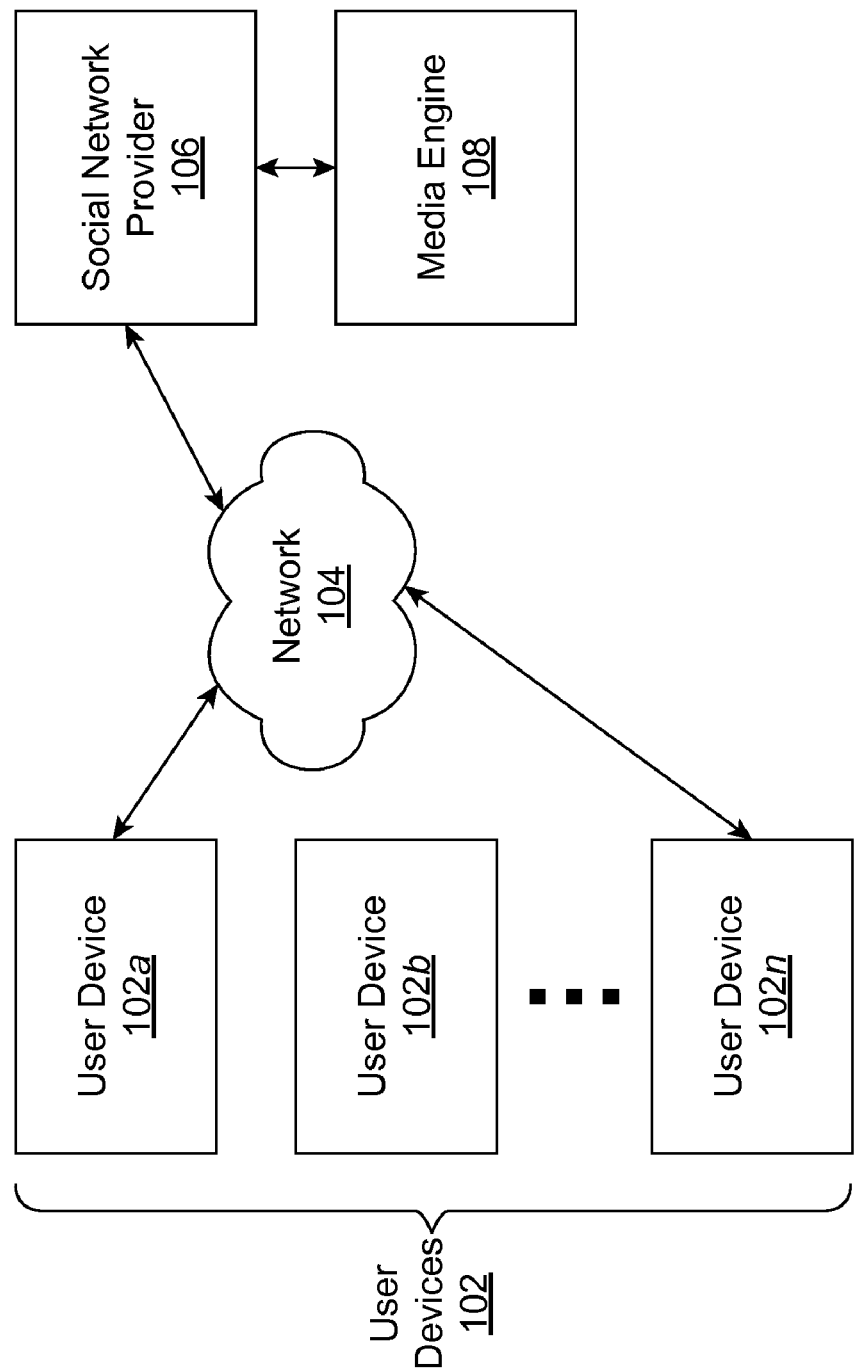
FIG. 1 is a diagram of an exemplary architecture for providing dynamically selected media to a user of an electronic device in a social network environment.

FIG. 1 is a diagram of an exemplary architecture for presenting dynamically selected media to a user of an electronic device in a social network environment. User devices 102, such as a user device 102a, a user device 102b, and a user device 102n, communicate over a network 104 with a social network provider 106. The user devices 102a-102n may comprise any device associated with one or more users, such as a cellular telephone, a personal digital assistant, a desktop or a laptop computer, and so forth. Any types of user devices 102 are within the scope of various embodiments.

The social network provider 106 may comprise any user or entity that provides social networking services, communication services, dating services, and so forth. For example, the social network provider 106 may host a website that allows one or more users at the user devices 102 to communicate with one another via the website. In one instance, the user associated with the user device 102a may communicate with the user associated with the user device 102b via a social networking website associated with the social network provider 106 that offers the user an opportunity to connect or reconnect with one or more other users that attended, for example, the same university as the user.

A media engine 108 is coupled to the social network provider 106. In one embodiment, the media engine 108 can select items of media content based on the user's relationships with other users through the social network provider 106. The media engine 108 analyzes the frequency of the user's interactions with other users through the social network provider 106 and with the selected items of media. The results of this analysis are used to rank the importance of the other users to the user, so that new items of media content are selected and displayed to the user in the order of the content's anticipated importance or interest to the user.

For example, a user at the user device 102a uses a cursor to click on items of media content related to his sister Abby very frequently, and to click on emails from his friend Bob somewhat less frequently. The items of media content selected by the media engine 108 will be dynamically presented to the user at the user device 102a with an importance ranking based on an analysis of the frequencies of the user's interactions with items of media content associated with his friends, so that items of media content associated with Abby will be presented first to the user at the user device 102a, followed by items of media content associated with Bob. For example, the items of media content may be news stories about the other users Abby and Bob. Such news stories would be presented to the user as stories about "your sister" and "your best friend," so that the wording and content of the stories would not be meaningful to someone other than the users.

In an embodiment not shown, the media engine 108 can receive media content preference settings selections from the users at the user devices 102. The media engine 108 can save the media content preference settings to a profile associated with each user. Once the media content preference settings are selected by the user, the media engine 108 can use the media content preference settings to insure that items of media content concerning particular relationships between the user and other users are not displayed to the user.

The users at the user devices 102 can group other users, events or objects according to categories, such as "friends", "school", "geography", "business", and so forth, and select a media content preference setting applicable to an entire category; any type of grouping may be employed by the user and/or the social network provider 106. Further, according to some embodiments, the user may make media content preference settings applicable to individual other users, events or objects. For instance, the user may select media content preference settings for Jane, media content preference settings for John, and/or media content preference settings for groups of users, which may or may not include Jane and John.

Figure 2:
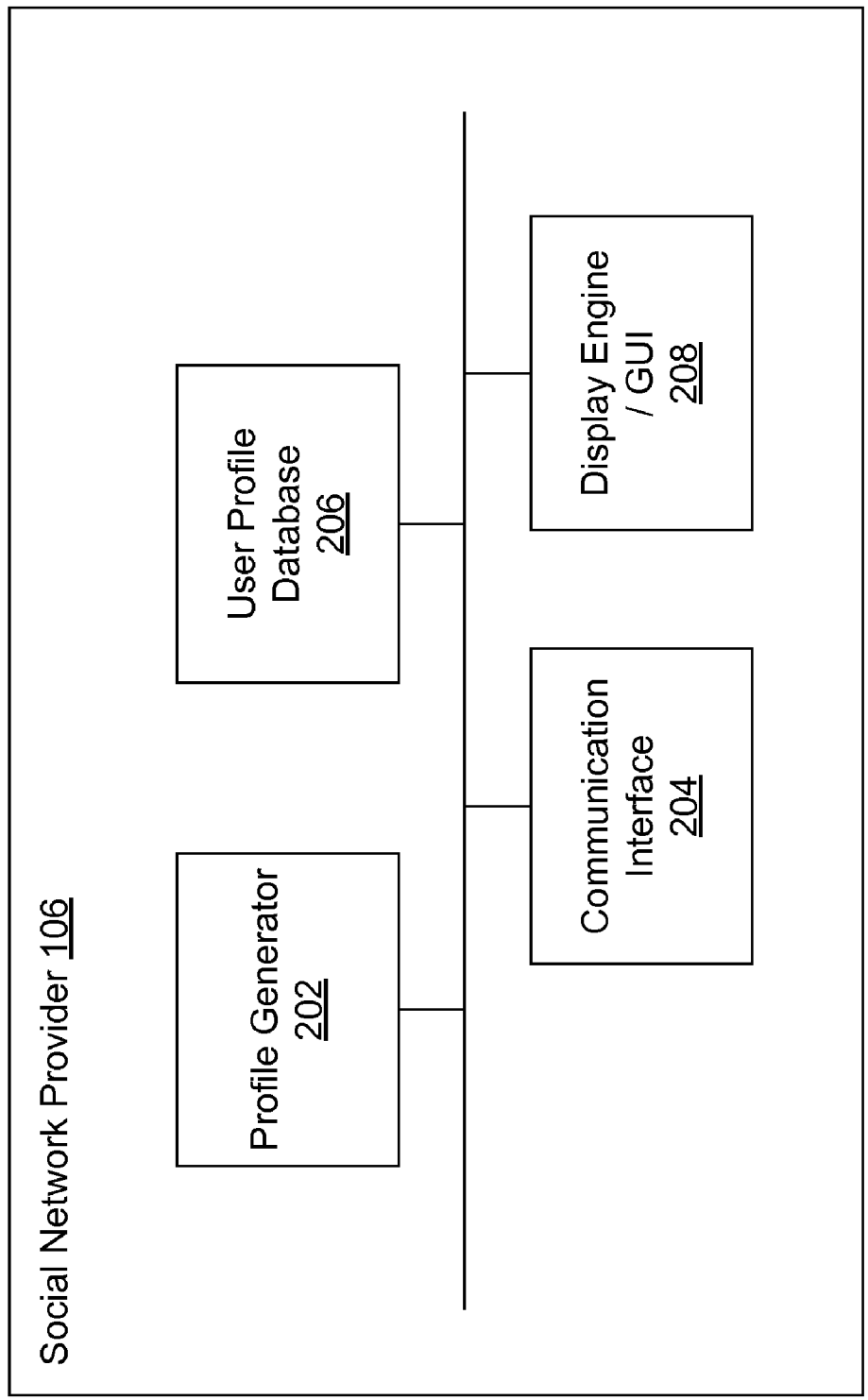
FIG. 2 is a block diagram of an exemplary social network provider.

Referring now to FIG. 2, a block diagram of an exemplary system for providing a social network 106 is illustrated. The social network provider 106 may comprise a server, a client device, or any other device.

The social network provider 106 includes a profile generator 202 for creating the profile for the user, as discussed herein. For example, the user may provide contact information, friends, photos, and so forth to associate with the profile for the user. The profile generator 202 utilizes the information provided by the user to create the profile (i.e., the user profile). As discussed herein, the profile may include one or more categories or subcategories and news priority settings selections may be provided for each of the one or more categories or subcategories.

The social network provider 106 includes a communications interface 204 for communicating with the user devices 102, such as the user devices 102a-102n described herein, over the network 104. The user devices 102 communicate various types of information, such as media content preference settings selections, groupings of other users, and so forth to the social network provider 106 via the communications interface 204. Any type of communications interface 204 is within the scope of various embodiments.

A user profile database 206 is provided for storing data associated with each of the users, such as the users associated with the user devices 102a-102n, in the user profiles created by the profile generator 202. When the users at the user devices 102 select media content preference settings to associate with their user profiles, the user profile database 206 updates the user data associated with each user profile. Accordingly, the media content preference settings selections are stored in association with each user profile. The user profiles and/or the media content preference settings selections may be stored, modified, added, and so forth to any storage medium, according to some embodiments.

A display engine/GUI 208 may also be provided by the social network provider 106. The display engine/GUI 208 displays dynamically selected items of media, the user's profile, and so forth to a user of an electronic device in a social network environment to the users associated with the user devices 102. The users can interact with the social network provider 106 via the display engine/GUI 208. For example, the users can access the dynamically selected items of media, their own user profile, other items of media content available via the social network provider, select media content preference settings, and so forth via the display engine/GUI 208.

Although the social network provider 106 is described as being comprised of various components (the profile generator 202, the communications interface 204, the user profile database 206, and the display engine/GUI 208), fewer or more components may comprise the social network provider 106 and still fall within the scope of various embodiments.

Figure 3:
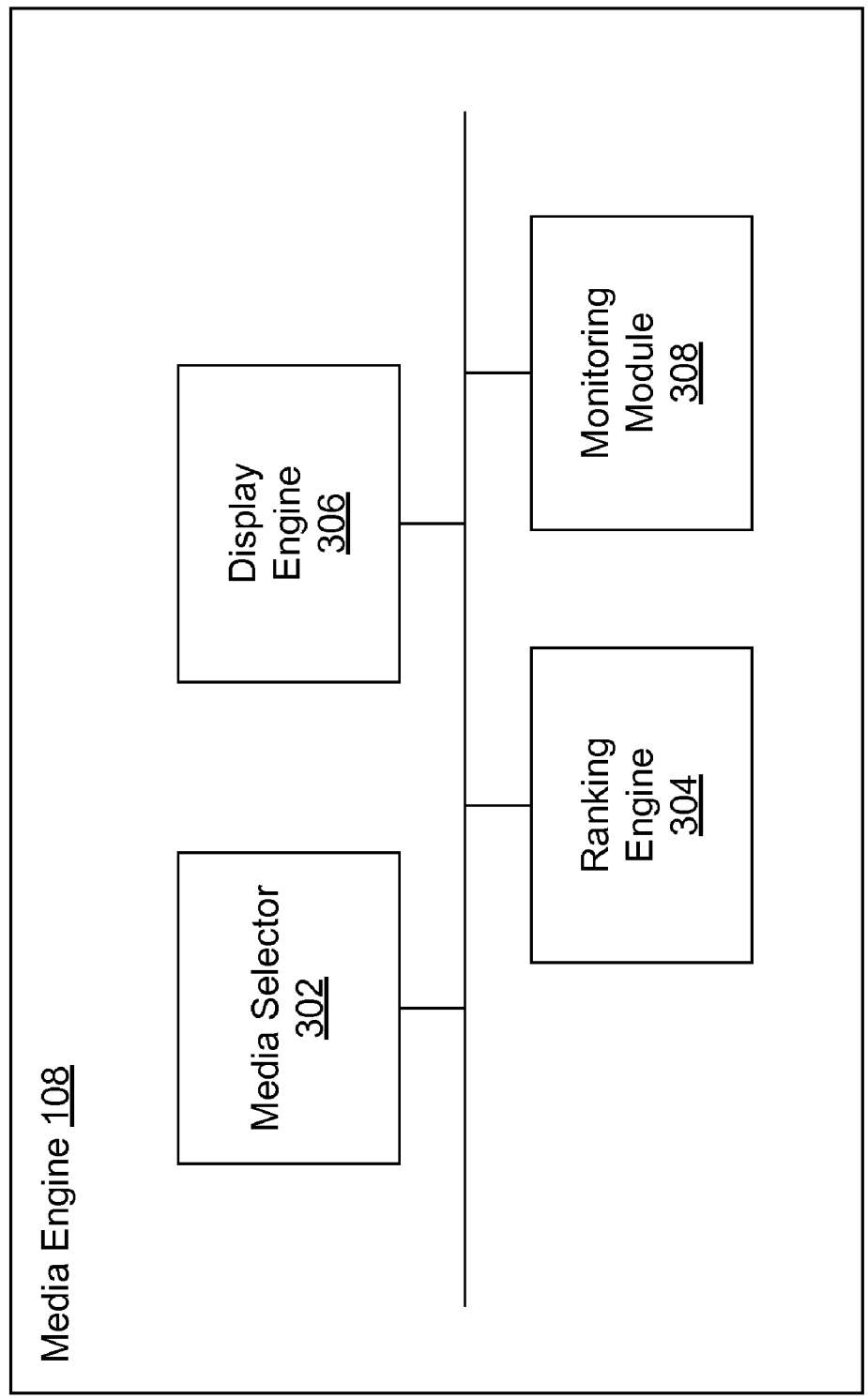
FIG. 3 is a block diagram of an exemplary media engine.

FIG. 3 is a block diagram of an exemplary media engine 108. A media selector 302 gathers items of media content available through the social network provider, consolidates them and prepares them for presentation to the user. For example, the media selector 302 finds four items of media content associated with Abby and six items of media content associated with Bob, arranges them in the order provided by the ranking engine 304, formats them in language intelligible only to the user as discussed above, and presents them to the user via the display engine 306.

For example, in some embodiments the media selector 302 can identify items of media content associated with relationships, events or objects that receive high rankings from the ranking engine 304, locate information related to the items of media content associated with the 20 relationships, events or objects of greatest interest to the user, and consolidate that information into content for personalized, dynamic presentation on those 20 topics.

A ranking engine 304 analyzes the frequency of user actions associated with particular relationships, events and objects, or categories or subcategories of relationships, events or objects made available via the social network provider 106. According to some embodiments, the ranking engine 304 comprises a database or other storage medium that stores user interaction data. Alternatively, the monitoring module 308 comprises a database or other storage medium that stores user interaction data. The ranking engine 304 examines the user interaction data, uses an algorithm to weight the items of media content associated with relationships, events and objects, individually and/or in categories relative to the frequency of user interaction with these items of media. The ranking engine 304 orders the items of media content based on the measured frequencies of user interaction, generating a list of the items of media content reflecting their importance to the user. For example, the items of media content may be arranged in descending order of their importance to the user, in that a highest frequency of user interactions with items of media content associated with a particular relationship results in items of media content pertaining to that relationship being listed first. Alternatively, any algorithm could be used by the ranking engine, to generate other orders for the items of media content on other bases. In some embodiments, the order generated for the items of media content is based on the user affinity described in U.S. application Ser. No. 11/503,093, cited above.

Because user interest may vary over short and long timescales, the weighting may change as a function of time in some embodiments. For example, a user planning a trip may be very interested in news of other users who have traveled recently, in news of trips identified as events by other users, and in travel information, and then be much less interested in these relationships, events, objects, or categories or subcategories thereof upon his return. Thus, items of media content associated with another user who has traveled recently may receive a large weighting relative to other items of media, and the weighting will decay steeply so that the weighting is low by the time of the user's return. Alternatively, the weighting associated with individual relationships, events and objects, or categories or subcategories thereof that are of long-term interest may remain steadily high.

A display engine 306 receives the consolidated, ordered items of media content from the media selector 302 and creates a presentation of personalized, dynamically selected media that may be most meaningful to the user because of its basis in the user's personal relationships. For example, the display engine 306 may personalize a media item topic heading to information about a particular relationship, such as that between the user and his brother, and modify the content of the media item so that it is about "your brother." Any number of such translations may be used to tailor the display to the user based on his relationships with other users. In some embodiments, the presentation of personalized, dynamically selected media that may be most meaningful to the user because of its basis in the user's personal relationships may be formatted by the media selector 302, and forwarded with modifications completed to the display engine 306.

According to some embodiments, the display engine 306 comprises a database or other storage medium that stores translation data, which the display engine 306 accesses in order to create a personalized, dynamic news feed, which immediately informs the user of any new items of media content introduced to the social network environment that may be of interest to the user. The display engine 306 may then forward the news feed to the display engine/GUI 208 for display to the user associated with the particular news feed display. The immediately updated display is discussed in further detail in association with FIG. 4. In some embodiments, the media selector 302 comprises the database or other storage medium that stores translation data. In some embodiments, the display engine/GUI 208 may be identical with the display engine 306.

A monitoring module 308 tracks user interactions with items of media content made available via the social network provider 106 to determine which relationships, events and objects are most interesting to the user by measuring the frequency of the user's interactions with the items of media content available through the social network provider. The frequency of user actions associated with particular relationships, events and objects, or categories or subcategories of relationships, events or objects is recorded. According to some embodiments, the monitoring module 308 comprises a database or other storage medium that stores interaction data, which the ranking engine 304 accesses so that the ranking engine 304 can order the items of media content based on the measured frequencies of user interaction, generating a list of the items of media content reflecting their importance to the user. For example, the monitoring module can count the number of times the user accesses email from his brother, or the number of times the user clicked on dynamically selected items of media content reflecting news about his best friend.

Figure 4:
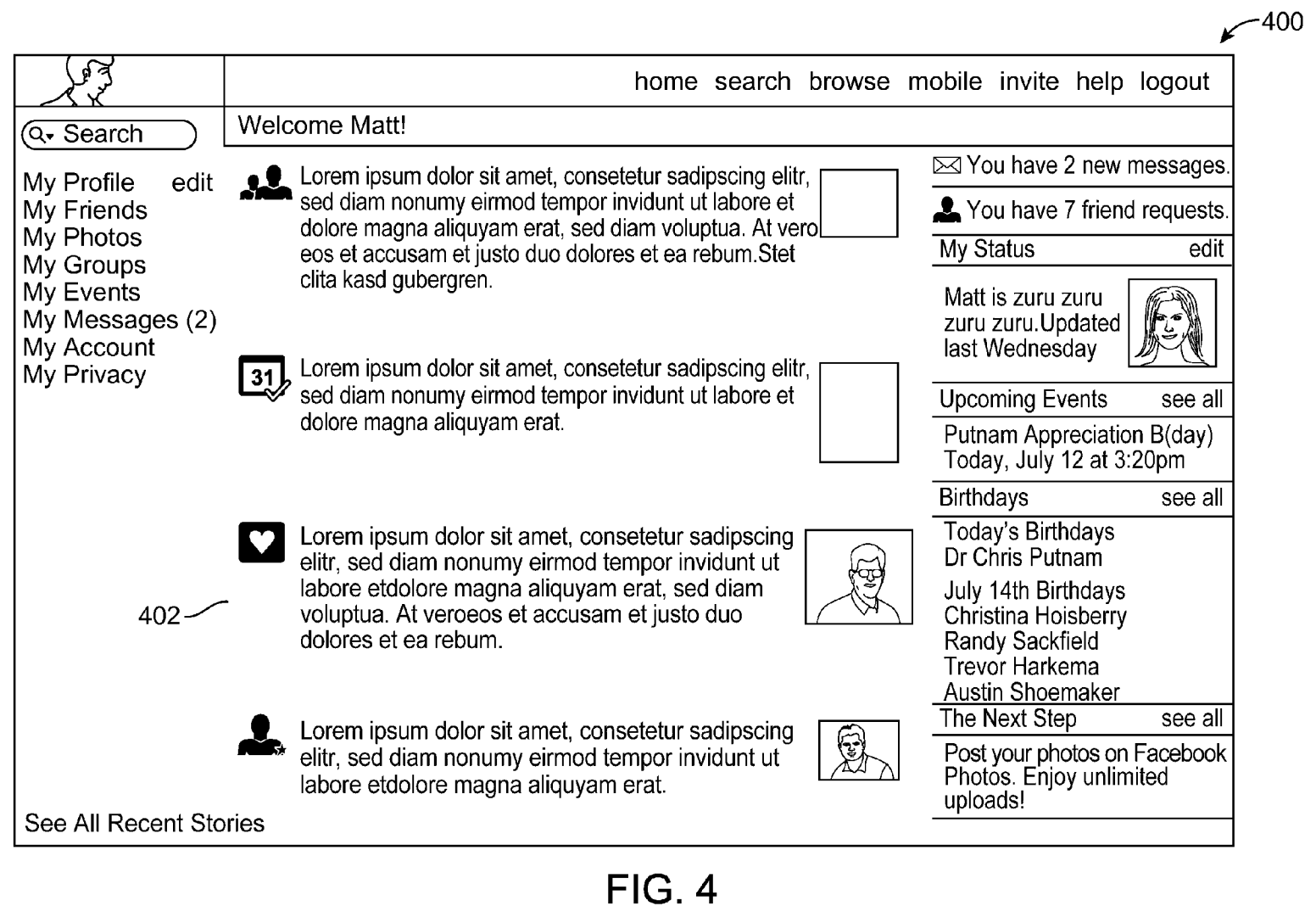

FIG. 4 shows an exemplary presentation screen 400 of dynamically selected media content to a user of an electronic device in a social network environment. As discussed herein, the presentation 400 of personalized, dynamically selected media content utilizes the user action analysis generated by the ranking engine 304 to present news gathered by the media selector 302 and organized by the ranking engine 304 (or alternatively, organized by the media selector 302) to the user in a coherent, up-to-date form for easy comprehension. Further, the news has been processed to minimize redundancy and presented in a narrative form by the media selector 302 or alternatively, by the display engine 306. (In FIG. 4 neither Brittney nor Megan has a special relationship with the user.

As discussed herein, if desired, the screen could say, "your sister" for Brittney, or "your best friend" for Megan, for example.)

Four dynamically selected items of media content based on the user's relationships with other users 402 are displayed. In the presentation 400 in FIG. 4, the user's most important relationships are with Megan, Brittney and the group Country Music Listeners. The weighting of user interactions with items of media content associated with these relationships resulted in the item of media reflecting two of these three most important relationships being presented at the top of the display, followed by items of media content (here, news stories) about Megan, then other news stories about Brittney.

As discussed herein, the display engine/GUI 208 may display the presentation 400. Further, as also discussed herein, the user may input selections for various media content preference setting selections associated with one or more relationships associated with items of media content in the social network environment. Accordingly, the user profile database 208 is updated with the user's media content preference setting selections for each relationship. The user interaction analysis and the user profile are utilized by the media selector 302 to create the presentation of personalized, dynamically selected media. The display engine/GUI 306 is then utilized to display the personalized, dynamic news feed to the user, in order to keep the user up to date on relationships, events and objects of interest to the user as indicated by the media content preference setting selections chosen by the user and the analysis selected by the ranking engine 304.

Figure 5:
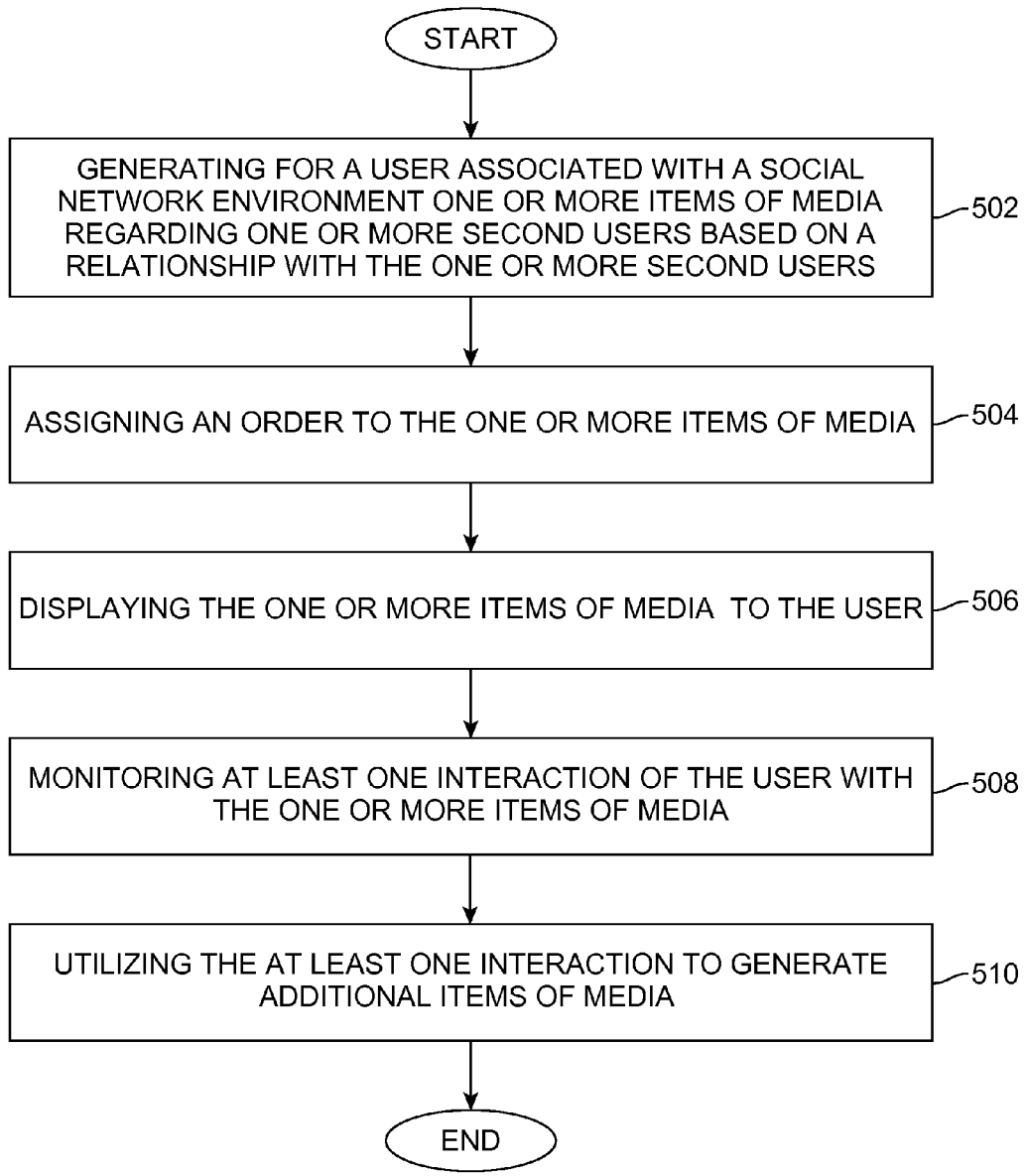
FIG. 5 is a flow chart of an exemplary process for providing dynamically selected media to a user of an electronic device in a social network environment.

FIG. 5 illustrates a flow diagram of an exemplary process for providing dynamically selected media to a user of an electronic device in a social network environment. At step 502 one or more items of media content regarding one or more second users based on a relationship with the one or more second users is selected for a user associated with a social network environment. As discussed herein, the relationship may include relationships with one or more individual users, or relationships with categories of users such as those in a geographical location network, a college network, and so forth. The items of media content may include one or more categories or subcategories, such as photos, event notices, invitations, bulletin board postings, contact information, emails, and so forth.

At step 504, an order is assigned to the one or more items of media content selected for the user. As discussed herein, a user action analysis is generated by tracking user actions and recording the frequencies of those actions with items of media content associated with various relationships, and ranking the various relationships in importance to the user. For example, a user interested in learning about the activities of his favorite group, such as a group of fellow college alumni near a reunion date, may click on items of media content associated with fellow college alumni with high frequency over a few days or weeks. The high-frequency of user action associated with fellow college alumni will result in a rank of high importance to the user for items of media content associated with fellow college alumni. In some embodiments not shown, the user may change the order of the items of media content, for example, via a separate settings display that allows the user to prioritize and/or filter certain items of media content, and/or also by using a "drag-and-drop" function to organize stories dynamically on the media content display.

At step 506 the one or more items of media content are displayed to the user in a consolidated, tailored form based on the order determined by the user interaction analysis. In the example discussed in the preceding paragraph, items of media content associated with fellow college alumni will be presented near the top of the display.

At step 508, at least one interaction of the user with items of media content in the social network environment is monitored. These items of media content may be from those selected by the media selector 302, but may also be any other media content available through the social network provider 106 accessed or viewed by the user. As discussed herein, the monitored frequencies of user interactions with items of media content associated with the user's relationships with other users are provided to the ranking engine to determine the order in which items of media content should be presented to the user.

At step 510, the monitoring of the at least one interaction of the user with items of media content in the social network environment is utilized to select additional items of media content for dynamic presentation to the user. As discussed herein, in some embodiments the ranked items of media content are converted into a news feed display, such as the exemplary presentation 400 illustrated in FIG. 4. The presentation 400 may combine content from the one or more relationships, networks, categories, and/or subcategories into one or more items of media content or categories of items of media.

While various embodiments have been described above, it should be understood that they have been presented by way of example only, and not limitation. For example, any of the elements associated with the dynamically selected media presentation may employ any of the desired functionality set forth hereinabove. Thus, the breadth and scope of a preferred embodiment should not be limited by any of the above-described exemplary embodiments.

Embodiments of this invention may also include a computer readable medium having embodied thereon a program, the program being executable by a processor for performing a method, as described herein, for providing dynamically selected media content to a user of an electronic device in a social network environment

What is claimed is:

1. A method comprising:
   storing in a database a user profile for a viewing user of a social network system, the user profile including an identification of a plurality of other users of the social network with whom the viewing user has established a connection;
   sending a newsfeed comprising a plurality of news stories selected based on the viewing user's affinity for content in the plurality of news stories to a user device for display to the viewing user, at least one of the news stories comprising a description about an action taken by at least one of the other users of the social networking system with whom the viewing user has established a connection;
   monitoring one or more interactions between the viewing user of the social network system and at least one of: another user of the social network system and media content in the social network system;
   updating the newsfeed to include one or more additional news stories selected based on the monitored interactions, at least one of the additional news stories describing an action taken by at least one of the other users of the social network system with whom the viewing user has established a connection; and
   sending the updated newsfeed comprising the selected additional news stories to the user device for display to the viewing user in an order that is based at least in part on the viewing user's affinity for the selected additional news stories.

2. The method of claim 1, wherein the order is also based in part on a preference setting in the user profile of the of the viewing user, the preference setting describing ordering of news stories in the newsfeed.

3. The method of claim 1, wherein the viewing user's affinity for the selected additional news stories is based at least in part on frequencies with which the viewing user interacts with other users of the social networking system taking actions described by the additional news stories.

4. The method of claim 1, wherein the viewing user's affinity for the selected additional news stories is based at least in part on frequencies with which the viewing user interacts with media content associated with other users of the social networking system with whom the viewing user has established a connection.

5. The method of claim 1, wherein the viewing user's affinity for a selected news story is based in part on a frequency with which the viewing user interacts with a user of the social network system taking an action described in the selected news story.

6. The method of claim 1, wherein the monitoring comprises recording the viewing user's actions associated with particular relationships, events, objects, categories of relationships, subcategories of relationships, categories of events, categories of objects, subcategories of events or subcategories of objects.

7. The method of claim 6, wherein the viewing user's affinity for the selected additional news stories is based at least in part on a frequency of the viewing user's actions associated with particular relationships, events, objects, categories of relationships, subcategories of relationships, categories of events, categories of objects, subcategories of events or subcategories of objects.

8. The method of claim 7, wherein a weighting is associated with one or more of the particular relationships, the events, the objects, the categories of relationships, the subcategories of relationships, the categories of events, the categories of objects, the subcategories of events or the subcategories of objects.

9. The method of claim 1, wherein a monitored interaction is with one or more items of media content contained in a news story selected for the viewing user.

10. The method of claim 1, wherein a monitored interaction is with one or more items of media content in the social network system outside of a news story that has been previously selected for the viewing user.

11. The method of claim 1, wherein a monitored interaction includes the viewing user's interaction with an email.

12. A method comprising:
    storing in a database a user profile for a viewing user of a social network system, the user profile including an identification of a plurality of other users of the social network with whom the viewing user has established a connection;
    sending a newsfeed comprising a plurality of news stories about users of the social network system selected from news stories based on the viewing user's affinity for content in the plurality of news stories to a user device for display to the viewing user;
    monitoring one or more interactions between the viewing user and at least one of: another user of the social network system and media content in the social network system;
    selecting additional news stories from the plurality of news stories based on one or more of the monitored interactions, at least one of the additional news stories including a description about an action taken by at least one of the other users of the social network system with whom the viewing user has established a connection;
    updating the newsfeed to include the selected additional news stories; and
    sending the updated newsfeed including the selected additional news stories to the user device for display to the viewing user in an order that is based at least in part on the viewing user's affinity for the selected additional news stories.

13. The method of claim 12, wherein the order is also based in part on a preference setting in the user profile of the of the viewing user, the preference setting describing ordering of news stories in the newsfeed.

14. The method of claim 12, wherein selecting additional news stories from the plurality of news stories comprises:
    determining, from the one or more monitored interactions, a frequency of the viewing user's actions associated with relationships between the viewing user and other users of the social networking system;
    weighting news stories associated with the relationships between the viewing user and other users of the social networking system so a weight associated with a relationship is relative to a frequency of the viewing user's actions associated with the relationship;
    ranking the news stories associated with the relationships based on the weight associated with the news stories; and
    selecting the additional news stories from the ranked news stories.

15. The method of claim 14, wherein ranking the news stories associated with the relationships is also based on one or more preference settings associated with one or more relationships, the one or more preference settings included in the user profile of the viewing user.

16. The method of claim 14, wherein the weight associated with the relationship is modified based on changes in the frequency of the viewing user's actions associated with the relationship over time.

17. The method of claim 12, wherein selecting additional news stories from the plurality of news stories comprises:
    determining, from the one or more monitored interactions, a frequency of the viewing user's actions associated with objects in the social networking system;
    weighting news stories associated with the objects in the social networking system so a weight associated with an object is relative to a frequency of the viewing user's actions associated with the object;
    ranking the news stories associated with the objects based on the weight associated with the news stories; and
    selecting the additional news stories from the ranked news stories.

18. The method of claim 12, wherein the viewing user's affinity for the selected additional news stories is based at least in part on frequencies with which the viewing user interacts with media content associated with other users of the social networking system with whom the viewing user has established a connection.

19. The method of claim 12, wherein the monitoring comprises recording the viewing user's actions associated with particular relationships, events, objects, categories of relationships, subcategories of relationships, categories of events, categories of objects, subcategories of events or subcategories of objects.

20. The method of claim 12, wherein a monitored interaction is with one or more items of media content contained in a news story selected for the viewing user.

21. The method of claim 12, wherein a monitored interaction is with one or more items of media content in the social network system outside of a news story that has been previously selected for the viewing user.

22. The method of claim 12, wherein a monitored interaction includes the viewing user's interaction with an email.

23. A method comprising:
   storing in a database a user profile for a viewing user of a social network system, the user profile including an identification of a plurality of other users of the social network with whom the viewing user has established a connection;
   monitoring one or more interactions between the viewing user and at least one of: another user of the social network system and media content in the social network system;
   selecting news stories from a plurality of news stories based on one or more of the monitored interactions, at least one of the news stories including a description about an action taken by at least one of the other users of the social network system with whom the viewing user has established a connection;
   updating a newsfeed sent to the viewing user to include the selected news stories, the newsfeed including news stories about actions taken by one or more other users of the social network system with whom the viewing user has established a connection; and
   sending the updated newsfeed comprising the selected news stories to the user device for display to the viewing user in an order that is based at least in part on the viewing user's affinity for the selected news stories.

24. The method of claim 23, wherein the order is also based in part on a preference setting in the user profile of the of the viewing user, the preference setting describing ordering of news stories in the newsfeed.

25. The method of claim 23, wherein selecting news stories from the plurality of news stories based on one or more of the monitored interactions comprises:
   determining, from the one or more monitored interactions, a frequency of the viewing user's interactions with relationships between the viewing user and other users of the social networking system;
   weighting news stories associated with the relationships between the viewing user and other users of the social networking system so a weight associated with a relationship is relative to a frequency of the viewing user's interactions with the relationship;
   ranking the news stories associated with the relationships based on the weight associated with the news stories; and
   selecting the additional news stories from the ranked news stories.

26. The method of claim 25, wherein ranking the news stories associated with the relationships is also based on one or more preference settings associated with one or more relationships, the one or more preference settings included in the user profile for the viewing user.

* * * * *